United States Patent [19]

Markham et al.

[11] Patent Number: 4,603,158

[45] Date of Patent: Jul. 29, 1986

[54] OPTICALLY TRANSPARENT ELASTOMERS

[75] Inventors: Richard L. Markham, Columbus; William J. Mueller, Worthington, both of Ohio

[73] Assignee: Battelle Development Corporation, Columbus, Ohio

[21] Appl. No.: 655,845

[22] Filed: Sep. 28, 1984

[51] Int. Cl.[4] .................. C08K 3/36; C08K 9/06; C08K 5/52; C08K 5/34

[52] U.S. Cl. .................. 524/100; 523/106; 523/212; 523/213; 523/216; 524/140; 524/141; 524/145; 524/384; 524/387; 524/388; 524/493; 524/532; 524/533

[58] Field of Search .............. 523/106, 212, 213, 216; 524/100, 145, 384, 387, 388, 493, 533, 140, 141, 532

[56] References Cited

U.S. PATENT DOCUMENTS

| | | | |
|---|---|---|---|
| 3,944,530 | 3/1976 | Sugita et al. | 524/570 |
| 4,048,409 | 9/1977 | Sugita et al. | 524/570 |
| 4,125,509 | 11/1978 | Vostovich | 524/291 |
| 4,303,574 | 12/1981 | Vostovich | 524/264 |
| 4,373,048 | 2/1983 | Schubert et al. | 524/249 |
| 4,382,112 | 5/1983 | Betts et al. | 524/81 |
| 4,459,380 | 7/1984 | Vostovich | 524/94 |

FOREIGN PATENT DOCUMENTS 1144853  3/1969  United Kingdom .

OTHER PUBLICATIONS

Research Disclosure, Jun. 1983 (23034) Kenneth Mason Pub. Ltd., ISSN0374-4353.

*Primary Examiner*—Herbert J. Lilling
*Attorney, Agent, or Firm*—Benjamin Mieliulis

[57] ABSTRACT

A novel optically clear combination which is a composition of matter is disclosed. The disclosed composition is an EPDM vulcanizate of remarkable clarity, the formulation of which involves a synergistic combination of EPDM elastomer, fumed silica, coupling agent, antioxidant, at least one and preferably two curing coagents, and preferably an antistatic agent.

17 Claims, No Drawings

OPTICALLY TRANSPARENT ELASTOMERS

The Government has rights in this invention pursuant to Contract No. DAAK11-81-C-0039 awarded by the U.S. Army Armament Research and Development Command. The invention described herein may be manufactured, used and licensed by or for the Government for governmental purposes without the payment to use of any royalty thereon.

FIELD OF INVENTION

This invention relates to elastomeric materials, especially vulcanized rubber. These types of materials have degrees of flexibility, are capable of undergoing reversible deformations at relatively low stresses, are generally amorphous, and generally have low glass transition temperatures. More particularly, this invention relates to ethylene/propylene elastomeric compositions especially ethylene-propylene-diene monomer rubber (EPDM). EPDM or ethylene-propylene-diene polymer as used throughout this application is understood to include ethylene-propylene conjugated diene rubber, ethylene propylene diene terpolymers, and ethylene propylene copolymers.

BACKGROUND OF INVENTION

This invention relates to optically transparent or clear elastomers. Transparent plastic materials such as, for example, polycarbonates and polystyrenes, have been known for many years. Being thermoplastic, however, these materials are of limited performance characteristics in terms of physical properties. Often these materials are rigid, or they readily are subject to flex crazing, or flow under stress, or they melt or deform at higher temperatures. Available clear plastic materials in general are not able to meet simultaneous requirements of flexibility, low haze, heat resistance, chemical resistance, and absence of flow under stress.

Some elastomers are known to have a degree of light transmissivity however few are known to be of true optical quality. Known EPDM vulcanizates display a range of characteristics that interfere with optical clarity. Such vulcanizates generally range from slight yellow to black, display considerable haze, tackiness, low permanent set or creasibility, are transluscent to opaque, or display blooming and hazing from constituent migration to the surface and therefore are generally recognized as inferior for optical lens applications. In compounding EPDM, the materials added for imparting strength and for curing generally make the EPDM opaque. A need exists for an EPDM rubber composition that maintains the transparency of the uncured gum without compromising other physical and chemical properties, such as chemical resistance, heat resistance, tensile and tear strengths, etc. A crosslinked thermally stable, chemically resistance and heat resistant flexible elastomer of optical quality would satisfy a long felt need in many optical applications in harsh environments, especially where glass is unsuitable, such as visors for protective suits for air personnel intended to protect against toxic agents, or visors intended for optical coupling to advanced graphic display weapons systems.

DESCRIPTION OF RELATED ART

Ethylene propylene diene polymers are known, but suffer serious visual drawbacks. Patents such as Nowell No. 3,929,715 describe EPDM oil based polymers.

Golombeck No. 4,059,558, Blumen No. 4,357,439, and Martin No. 3,741,931 disclose EPDM polymers with silica.

Golombeck teaches a silica-filled vulcanizable elastomer, however, does not begin to address transparency. The example in column 3 employs dixie clay, titanium dioxide, and zinc oxide—clearly on opaque composition.

Sugita No. 3,944,530 discloses an ethylene/propylene copolymer claimed to have transparency.

Pruett No. 3,256,666 teaches a transparent thermoplastic blend of polyethylene and polyvinyl acetate with an olefin hydrocarbon and silica filler. A cross-linked vulcanizate is not contemplated.

Other patents such as Wallrab No. 3,558,538, Eldred No. 3,988,227 and Cluff No. 3,578,624 show EPDM combinations.

None of the above art teach the combination of the present invention. None of the above prior art teach the present invention's synergistic combination of EPDM, fumed silica, coupling agent, antioxidant, two curing coagents, a peroxide curing agent, and an antistatic agent together to yield a vulcanizate of remarkable clarity.

The U.S. Army Armament Research and Development Command simultaneously has carried on additional development in this area. A May 1980 report (Springborn Report), Chemical Systems Laboratory Contact Report, ARCSL-CR-80031; 95 Chem. Abstr. 44512 (1981); "Development of a Two-Piece Mask and Lens and Mold for Same" authored by Tilor Garic and Stephen B. King, Springborn Laboratories Inc., Enfield, Conn. documents some of the extensive efforts in this area.

Unlike the present invention, the Springborn Report (Pages 24 & 26) documents that as little as 3 parts silica were difficult to distribute even with use of imidazoline. When vinyl silane was used in the Springborn formulation, blooming resulted. The Springborn report at page 26, paragraph 4 states that when use of 15 parts silica was attempted, results were discouraging. The Springborn Report teaches against high level silica loadings. The Springborn composition does not teach applicants' combination which surprisingly can successfully accommodate high level silica loadings (up to 80 parts).

The Springborn Report also reports the unsuccessful effort to find an antioxidant that would not impart color or impair curing. The Springborn Report (page 40, paragraph 1) recognized the problem—most antioxidants, particularly those which can function as antiozonants disturb the peroxide curing process—but did not teach an effective solution; comprising with a material that was sought to be replaced.

Applicants' invention teaches a unique combination vulcanizate of remarkable clarity not taught anywhere in the prior art.

It is an object of this invention to disclose a novel elastomeric composition of matter.

It is an object of the present invention to disclose an optically transparent elastomeric composition, particularly a cross-linked elastomeric composition.

It is a further object of this invention to disclose an optically clear vulcanized rubber and particularly to disclose an optically clear vulcanized rubber having the combination of properties of flexibility, heat resistance, cleanability, absence of haze, absence of flow under stress, and usefulness as a lens for optical coupling.

SUMMARY OF INVENTION

The present invention is a novel optically transparent composition of matter comprising a unique combination of defined proportions of ethylene-propylene-diene monomer rubber, silica filler, coupling agent, antioxidant, at least one and preferably two curing coagents, and an antistatic agent. Considerable synergism among the various constituents is observed.

The formulation of the present invention discloses a formulation for a rubber composition which has the combination of properties of high clarity, good cleanability, low haze and remarkable optical transparency of a degree never before achieved. The key to low haze is believed to be the unique combination of polymer, filler, coupling agent, curing agent and coagents, antioxidant and antistatic agent. In addition to high clarity and cleanability, the composition disclosed is relatively chemically inert, moderately heat resistant, flow resistant, and can be produced over a range of flexibilities.

DESCRIPTION OF PREFERRED EMBODIMENTS

The unique optically clear elastomer or vulcanizate of the present invention comprises a unique combination of defined proportions of EPDM elastomer, fumed silica, coupling agent, antioxidant, curing coagents, and an antistatic agent. Considerable synergism among the various constituents occurs; for example, the antistatic agent displays an unusual phenomenon of also functioning as a mold release, a property not typically attributed to this antistatic agent. The vulcanizate has remarkable clarity, low haze, heat resistance, flow or creep resistance and can be produced over a range of flexibilities.

It was Applicants' experience that samples could be screened as to optical clarity on the basis of simple pass/fail visual inspection. Light transmissivity can be determined by accepted standard techniques, such as ASTM D1003 used herein. ASTM Method D1003-61 "Haze and Luminous Transmittance of Transparent Plastics" is incorporated herein by specific reference (Volume 08.01 1984 Annual book of ASTM standards).

It is to be understood that all light transmissivity and haze values stated throughout this application are based upon transmission and haze tests on approximately 75 mils thickness samples tested at room temperature.

The present invention enables the molding of an EPDM lens of remarkable clarity with light transmission greater than 80% and haze below 10%; and transmissivity levels exceeding 85% with haze $\leq$ 10% were easily achievable. Light transmission greater than 90% was consistently achievable with haze below 10%, and as can be seen in Example 1 herein, haze was below 7%.

The elastomer used in this invention is ethylene-propylene-diene monomer rubber (EPDM) and is understood to include ethylene-propylene conjugated diene rubber, ethylene propylene diene terpolymers and ethylene propylene copolymers.

Ethylene propylene diene monomer rubber is preferred, and more specifically, for processability the preferred EPDM elastomer is one that is of low molecular weight and preferably with a low gel content. Ethylene/propylene/1,4-hexadiene with a Mooney viscosity of 18 (ML 4 250F) was particularly useful. The preferred ethylene/propylene/1,4-hexadiene rubber was comprised essentially as follows: ethylene (approx. 65%)/propylene (balance)/1,4-hexadiene (approx. 0–10%). The above monomeric unit constituents of the rubber in terms of percent are approximate and it was found the percentages can vary over a wide range without detracting from the invention's effectiveness. ASTM Method D3900-80, incorporated by reference, provides procedures for determination of ethylene units in EPDM.

EPDMs are available in various ethylene content. Preferred EPDMs for this invention had an ethylene content of approximately 50–75%. DuPont Nordel ® EPDM's were found useful. It was Applicant's experience that at ethylene content approaching 75% the rubber tended to acquire more polyethylene character especially as to the presence of crystallites contributing to haze. At the upper ethylene limits differences in polymerization processes for forming the polymer including catalysts, methods of addition, speed of addition, etc., may take some suppliers' EPDMs work better than others. The amount of crystallinity and size of crystallites is influenced by the process of forming the polymer.

The dienes of the EPDM can include any of the conventional dienes commercially available including not by way of limitation hexadiene, methylene norbornene, dicyclopentadiene and others.

The filler is a microparticulate silica with a particle size generally not exceeding 100 millimicrons. An average size of 25 millimicrons or less was advantageous and a size not substantially exceeding 15 millimicrons being preferred. The size requirement is the critical aspect to the silica filler and appears more important than the process of production. Ground silicas and precipitated silicas generally were unable to meet the size requirements, but it is anticipated would function in the invention if available in the needed size range. The silica must be carefully chosen to be of relatively high purity, free of interfering ions from colloidal material and it is preferred free of incipient gellation, characteristic, for example, of colloidal silica sols. A particularly useful silica was found to be fumed silica sold under the trademark Cabosil with a 0.014 micron nominal size. Fumed silica is understood herein to include pyrogenic or pyrolitic silicas. The useful silicas generally have a surface area exceeding 25 in$^2$/g.

To achieve high light transmissivity levels the silica can be selected such that the refractive index approximates that of the elastomer. Silicas exceeding 100 millimicrons (1000 Å) effective particle size introduce haze to the rubber as the particles approach the wavelength of visible light.

As is well known in the art, silica fillers are made up of ultimate particles which can be aggregated to form aggregates which are structured silica particles capable of acting as a reinforcing filler. It is these aggregates which should be sufficiently small i.e., below 1000 Angstroms, or the wavelength of visible light, to minimize haze.

The size of silica particles and whether they are substantially discrete or whether they are agglomerated can be observed by electron microscopy. Effective particle size as used throughout this invention is intended to refer to ultimate particles and also to agglomerates of ultimate particles acting as an individual particle. It is useful if 80% of the particles have an average diameter not exceeding 2× the mean particle diameter.

Where an effective particle size is stated it is understood that in a collection of microparticulates, there may be found ultimate particles and also agglomerates of ultimate particles exceeding the stated effective particle size. It is envisioned that if the majority of the individual ultimate particles and the agglomerates do not exceed the effective particle size maximum, that undesirable hazing can be kept to a minimum. It is preferred if 80% or more of the particles and agglomerates do not exceed the effective particle size limit.

For clarity, it is to be understood throughout this application that where an effective particle size is stated it shall mean by definition that the majority of silica particles and agglomerates together in the composition shall be below the stated size.

In the practice of this invention Cabosil MS-7 was particularly useful.

It can be advantageous to classify the commercial silica filler and discard 10–20 percent of the coarser particles.

Tables 1, 2, and 3 further describe the invention, characterizing various silicas. Table 4 describes a preferred embodiment of the invention.

TABLE 1

|  | Surface area in²/g | Ultimate particle size |
|---|---|---|
| precipitated silica (Kirk Othmer Encycl.) | 45–700 | 10–25 millimicrons |
| pyrogenic silica | 15–400 | 1–100 millimicrons |

TABLE 1-continued

|  | Surface area in²/g | Ultimate particle size |
|---|---|---|
| (Kirk Othmer Encycl.) |  |  |
| Hi-Sil | 110 | 25 millimicrons |
| Aerosil (Dow Corning) | 300–350 | 4–20 millimicrons |
| Aerosil (Cabot) | 175–200 | 15–20 millimicrons |
| Cabosil (Cabot) | 175–200 | 14–22 millimicrons |

TABLE 2

| Silica | Particle Size (electron microscope) (millimicrons) | S.G. ($d_6^{25}$) |
|---|---|---|
| Aerosil | 15 | 2.34 |
| Santocel CS | 15 | 2.11 |
| Durasil | 20 | 1.96 |
| Estersil GT | 7 | 1.98 |

TABLE 3

RESULTS OBTAINED USING ALTERNATE SILICAS

| Silica | Type | Average Particle Size, millimicrons | Supplier | Comments |
|---|---|---|---|---|
| MS-7 | Hydrophilic | 14 | Cabot Corporation | Preferred |
| S-17 | Hydrophilic | 7 | Cabot Corporation | Not significantly different from MS-7 |
| Hi Sil 233 | Precipitated | 22 | PPG | Imparts more haze than MS-7 |
| Tullanox | Super hydrophilic | 7 | Tulco, Inc. | Hard to handle |
| Insul A108K | Micronized, coated | 25 | Illinois Mineral Corp. | Imparts color |
| R-972 | Hydrophobic | 16 | Degussa Corporation | Not significantly different from MS-7 |

The silica loading level involves a balancing of desired properties some of which are contradictory. Increasing the loading level within limits increases tensile and tear strengths, hardness, and cleanability, however, decreases flexibility to levels unacceptable in some applications.

The silica loading level, unlike particle size, was unexpected found not to have an appreciable effect on haze. See Table 5. Silica loadings even to 80 parts per hundred rubber (phr) were found to have haze percentages generally below 10%.

TABLE 4

|  |  | Preferred Composition (phr) | Useful Range (phr) |
|---|---|---|---|
| Polymer | ethylene/propylene/1-4 hexadiene | 100 | 100 |
| Filler | silica (100 millimicrons or less effective particle size) | 30 | 10–80 |
| Coupling Agent | methacryloxypropyl trimethoxy silane | 0.6 | 0.2–1.6 |
| Antioxidant | 3,5-ditert-butyl-4-hydrocinnamic acid triester with 1,3,5-tris (2-hydroxy ethyl) triazine-2,4,6-trione | 1 | 0.5–2.0 |
| Coagents | trimethylol propane trimethacrylate | 2.5 | 0–20 |
|  | 1,2-polybutadiene | 2.5 | 0–20 |
| Antistatic Agent | (phosphoric acid ester) | 1 | 0.25–3 |
| Curing Agent | ditertbutyl peroxide | 3 | 1–5 |

TABLE 5

Effect of Silica Loading

|  | Silica Level, phr | Haze, % | Transmission, % | Tensile at Break psi | Elongation at Break % | Yellowness Index Original | Thickness, mils | Index/ mil |
|---|---|---|---|---|---|---|---|---|
| 1. | 30 | 5.5 | 91.6 | 1720 | 450 | 8.15 | 58 | 0.140 |
| 2. | 40 | 5.0 | 90.6 | 2350 | 420 | 9.01 | 71 | 0.127 |
| 3. | 50 | 4.7 | 90.1 | 2980 | 520 | 9.52 | 80 | 0.119 |
| 4. | 60 | 10.8 | 85.3 | 2440 | 250 | 14.74 | 100 | 0.147 |

TABLE 5-continued

| | | | Effect of Silica Loading | | | | |
|---|---|---|---|---|---|---|---|
| | Silica | | Tensile | Elongation | Yellowness Index | | |
| | Level, phr | Haze, % | Transmission, % | at Break psi | at Break % | Original | Thickness, mils | Index/ mil |
| 5. | 60 | — | — | 2870 | 420 | 15.37 | 74 | 0.208 |
| 6. | 70 | 6.2 | 87.3 | 2260 | 250 | 16.39 | 93 | 0.176 |
| 7. | 80 | 9.7 | 86.5 | 2360 | 300 | 16.77 | 95 | 0.176 |

(in all cases, amount of coupling agent methacryloxypropyl trimethoxy silane was 2% by weight compared to silica)

A coupling agent was incorporated to enhance integration of the silica filler into the EPDM elastomer. The silane coupling agent was incorporated at concentrations from 0.2 to 1.6 parts with 0.6 parts being preferred. (Parts refer to phr and are based on weight. Phr refers to parts per hundred rubber. Unless otherwise indicated, measurements and proportions in this application are on the basis of weight.) 3-methacryoxypropyl trimethoxy silane is preferred.

Other useful coupling agents could include but would not be limited to any of the trialkoxysilanes such as n-(2-aminoethyl)-3-amino-propyltrimethoxy silane, 3 [2(vinyl benzylamino)ethylamino]propyltrimethoxy silane, 3-glycidoxypropyltrimethoxy silane, triacetoxyvinyl silane, tris(2-methoxy ethoxy)vinyl silane, 3-chloropropyltrimethoxy silane, γ-methacryloxypropylethoxy-dimethoxy silane, (3,4-epoxycyclohexyl)-ethyltrimethoxy silane, isobutyl-trimethoxy silane, and octyl-triethoxy silane.

The silane coupling agent can be milled into the composition the same as any other ingredient or it can be preblended with the filler before the filler is added to the polymer. The latter method is recommended; however, no significant differences of final product with either method were noted.

A useful guideline is to employ 2% of silane coupling agent by weight based on the silica. It is envisioned that two or more coupling agents can be advantageously used together.

An antioxidant was incorporated from 0.5 to 2.0 parts by weight (phr). Preferred antioxidants for best color, clarity, and resistance to oxidation are 1,3,5-trimethyl-2,4,6-tris(3,5-ditertbutyl-4-hydroxy benzene) and 3,5-ditertbutyl-4-hydroxycinnamic acid triester with 1,3,5-tris-(2-hydroxyethyl)triazine-2,4,6-trione.

Other antioxidants include 2,2-methylene bis(4-methyl-6-tertiary butylphenol), 2,6-di-t-butyl-4-methyl phenol and 1,1,3-tris-(2-methyl-4-hydroxy-5-tertbutylphenyl)butane.

Antioxidants comprising metallo organic compounds, also the antioxidants 2,6-di-t-butyl-4-methyl phenol, and 2,2-methylene bis(4-methyl-6-tertiarybutyl phenol), were less effective in this invention than the other antioxidants.

A curing agent at 1-5 phr is also incorporated in the optically clear EPDM elastomer formulation. The curing agent is a free radical curing agent preferably peroxide curing agent and is chosen so as to impart an acceptable curing time while not detracting from color, odor, and optical clarity.

Peroxide curing agents include ditertiary butyl peroxide, cumene hydroperoxide, and t-butylhydroperoxide. The preferred curing agent is a peroxide having a melting point below 30° C., i.e. it is a liquid at room temperature. The preferred curing agent is the clear ditertbutyl-peroxide. Surprisingly, γ,γ'-bis(t-butyl peroxy diisopropyl benzene), a curing agent commonly recommended for light-colored EPDM compositions, was less effective than the di-tert-butyl-peroxide. It was found this curing agent contributed to the color of the cured vulcanizates.

Dicumyl peroxide appears to cure the system but is not favored for use in this invention as it was found to give residual peroxide odor.

Free radical initiators are well known in the art and beside peroxide compounds include the azo class of initiators such as azobisisobutyronitrile, silane compounds containing vinyl or a multiplicity of SiH groups, polymercaptan compounds such as tetrathiopropionic esters of tetraerythritol with for example benzylphenone to provide UV initiation.

One or more coagents are included in the formulation and serve to increase the efficiency of the peroxide curing agent. Two coagents combined are preferred. The coagents are liquids which covulcanize into the system increasing the crosslink density but do not bloom to the surface as is typical of EPDM processing oils. The coagents are 0-20 parts trimethylol propane trimethacrylate and 0-20 parts low molecular weight 1-2,polybutadiene. The preferred formulation uses a mixture of both at 2.5 parts (phr) respectively. Unexpectedly, the combination of two coagents produced lower haze and stress crazing than either coagent could yield by itself.

Two other unexpected advantages of the coagents were found to be a reduction of roughness of uncured sheets and reduced surface tack.

Co-curing agents or co-agents are well known in the art. Co-curing agents generally do not initiate cure however once cure is initiated by for example, peroxide, the co-curing agent being polyfunctional rapidly forms free radicals increasing the efficiency of the curing agent. The co-curing agent actively takes part in the cross-linking by the same free radical mechanism as the peroxide itself. While trimethylol propane trimethacrylate and 1,2-polybutadiene and combination of both are preferred in this composition, other co-curing agents to improve crosslink density can be selected from almost any low molecular weight polyunsaturated compound. Multifunctional acrylates such as diols or polyols esterfied with acrylates or methacrylates are particularly common co-curing agents. U.S. Pat. No. 3,261,888 teaches use of polyfunctional methacrylate monomers in the peroxide cure of EPDM, and is incorporated herein by specific reference. Other well known co-curing agents include urethane acryllic oligomers, acrylamides, triallylcyanourates, triallyisocyanoarate, divinyl benzene and polyvinylketones. It is envisioned that any monomer possessing at least 2 sites of unsaturation available for participating in the curing reaction can function as co-curing agents.

The co-agent should be incorporated at 0-20 phr. Esters of methacrylic acid are the most common commercially available co-agents such as Sartomer ® SR-206, SR-297 and SR-350 (ethylene glycol dimethacrylate, 1,3-butylene glycol dimethacrylate, and trimethylol propane trimethacrylate respectively).

An antistatic agent which is a phosphoric acid ester is optionally included in the composition to reduce electrostatic attraction of dust to the finished transparent part. Serendipitously, it was found that the antistatic agent functioned also as an effective mold release agent. Compositions without the antistatic agent were moldable but not preferred due to experiences with mold release.

The antistatic agent is preferably a partial ester of phosphoric acid and advantageously can be selected from any of the following monoesters or diesters or their salts of the formula:

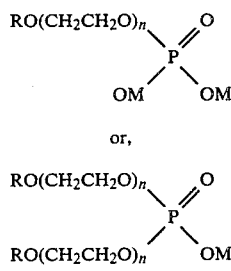

or, wherein R is an alkyl or alkylaryl radical preferably alkyl of 20 carbons or less n is 1 to 20 inclusive (n is the average number of moles of ethylene reacted with one mole of hydrophobic base.) and M is H, metal such as alkali or alkaline-earth metal including Na and K, ammonia, ammonium, zinc or other metal.

Typical such antistatic agents are available from GAF Corporation, 140 W. 51st Street, New York, sold under the Gafac ® trademark as Gafac surfactants. Gafac RD-510 was preferred. This phosphoric acid ester has a specific gravity 1.05–1.06, pH 1.5–2.5, acid number 100–115, and is formed by reaction with an aliphatic hydrophobic base.

EXAMPLES

Example 1

EPDM with various ethylene concentrations in EPDM. Nordel ®1470, Nordel ®1320, Nordel ®1145, and Nordel ®2744 are EPDM products of DuPont with differing ethylene percentages in the elastomer.

To each of these five EPDM materials (at 100 parts) were added 30 parts of Cabosil ®MS-7, 0.6 parts methacryloxypropyl trimethoxy silane A-174 (Union Carbide), 1 part 3,5-di-tertbutyl-4-hydroxycinnamic acid triester with 1,3,5-tris-(2-hydroxyethyl)triazine-2,-4,6-trione (Goodrite ®3125), 2.5 parts trimethylolpropane trimethacrylate (Sartomer 350) and 2.5 parts low molecular weight 1,2-polybutadiene (Ricon ®153), 3 parts di-tert-butyl peroxide and 1 part Gafac-510, a partial ester of phosphoric acid.

All four EPDM materials yielded acceptable optically clear products.

| Composites | EPDM Polymer | Haze | Transmission, % | Tensile | Elongation | Yellowness |
|---|---|---|---|---|---|---|
| 1 | Nordel ® 1470 | 6.6 | 89.7 | 1750 | 450 | 11.32 |
| 2 | Nordel ® 1320 | 5.5 | 91.6 | 1720 | 450 | 7.97 |
| 3 | Nordel ® 1145 | 6.9 | 90.9 | — | — | 9.21 |
| 4 | Nordel ® 2744 | 5.3 | 90.3 | 1590 | 700 | 9.28 |

Example 2

A lens formulation was comprised of the following:

|  | (phr) |
|---|---|
| EPDM (Nordel ® 1320) | 100 |
| Silica (Cabosil MS-7) | 30 |
| A-174 | 0.6 |
| Goodrite TM 3125 | 1 |
| Sartomer TM 350 | 2.5 |
| Ricon TM 153 | 2.5 |
| RD-510 | 1 |
| Di-tert-butyl peroxide | 2 |

Molding conditions for the above formulation were as follows:

| Mold temp. (upper & lower cavities) | 143–145° C. |
|---|---|
|  | 289–293° F. |
| Curing time | 30 minutes |

Mold closing was set at the highest speeds available on a 50 ton press in order to lower chances for premature cure. The molded lens of the above formulation was optically clear.

While the invention has been described with respect to particular embodiments thereof, it is intended these embodiments be considered illustrative rather than restrictive and the scope of the invention be defined by the appended claims.

I claim:

1. A composition for producing optically clear rubber, with a light transmission value greater than 80% and haze value less than 10%, said composition comprising on the basis of parts per hundred rubber by weight:
    (a) 100 phr ethylene-propylene-diene polymer,
    (b) 10 to 80 phr silica of 100 millimicron or less effective particle size,
    (c) 0.2 to 1.6 phr trialkoxy silane coupling agent,
    (d) 0.5 to 2.0 phr of an antioxidant,
    (e) 0–20 phr each of co-curing agent selected from one or more of trimethylol propane trimethacrylate, and 1,2-polybutadiene,
    (f) 1–5 phr of a peroxide curing agent.
2. The composition of claim 1 comprising in addition: 0.5 to 3 phr of a phosphoric acid ester.
3. The composition according to claim 1 wherein said trialkoxy silane coupling agent is selected from 3-methacryoxypropyltrimethoxy silane, N-(2-aminoethyl)-3-amino-propyltrimethoxy silane, 3-[2-(vinyl benzylamino)ethylamino]propyltrimethoxy silane, 3-glycidoxy propyltrimethoxy silane, triacetoxyvinyl silane, tris(2-methoxyethoxy)vinyl silane, 3-chloropropyltrimethoxy silane, γ-methacryloxypropylethoxy-dimethoxy silane, (3,4-epoxy-cyclohexyl)-ethyltrimethoxy silane, isobutyltrimethoxy silane, and octyltriethoxy silane.

4. The composition according to claim 1 wherein said trialkoxysilane coupling agent is 3-methacryloxypropyl trimethoxy silane.

5. The composition according to claim 1 wherein said ethlene-propylene-diene is ethylene-propylene-1,4-hexadiene.

6. The composition according to claim 5 wherein the ethylene comprises about 50–75% by weight of the polymer and the 1,4-hexadiene comprises about 0–10% by weight of the polymer.

7. The composition of claim 1 wherein said silica is fumed silica.

8. The composition of claim 7 wherein said silica has an effective particle of 15 millimicrons or less.

9. The composition of claim 1 wherein said antioxidant is selected from the group consisting of (i) 3,5-ditertbutyl-4-hydroxycinnamic acid triester with 1,3,5-tris(2-hydroxyethyl)triazine-2,4,6-trione and (ii) 1,3,5-trimethyl 2,4,6 tris(3,5 ditert-butyl-4-hydroxy benzene).

10. The composition of claim 1 wherein said antioxidant is selected from the group consisting of 2,2-methylene bis(4-methyl-6-tertiarybutyl phenol), 2,6-di-t-butyl-4-methylphenol and 1,1,3-tris(2-methyl-4-hydroxy-5-tertbutyl phenol)butane.

11. The composition of claim 1 wherein said peroxide curing agent is selected from ditertbutyl peroxide, γ,γ'-bis(t-butyl peroxy)diisopropyl benzene, cumene hydroperoxide, and t-butyl hydroperoxide.

12. A composition for producing transparent rubber compounds having a light transmission value through a thickness of 75 mils of 80% and a haze value less than 10%, said composition comprising on the basis of parts per hundred rubber (phr) by weight:
    (a) 100 phr ethylene-propylene-diene polymer
    (b) 10–80 phr particulate silica of 100 millimicron or less effective particle size
    (c) 0.2 to 1.6 phr trialkoxysilane coupling agent
    (d) 0.5 to 2.0 phr of an antioxidant
    (e) 0–20 phr each of co-curing agent selected from one or more of trimethylol propane trimethacrylate and 1,2-polybutadiene.
    (f) 1–5 phr of a free radical curing agent.

13. A molding composition for forming transparent rubber having a light transmission value through a thickness of 75 mils of 85% and a haze value less than 10% said composition comprising on the basis of parts per hundred rubber (phr) by weight:
    (a) 100 phr of ethylene-propylene-diene polymer,
    (b) 10–80 phr of particulate silica of 100 millimicron or less effective particle size,
    (c) 0.2–1.6 phr of a trialkoxysilane coupling agent,
    (d) 0.5 to 2.0 phr of an antioxidant,
    (e) 0–20 phr of co-curing agent,
    (f) 0.5 to 3 phr of an antistatic agent, and
    (g) 1–5 phr of a free-radical curing agent.

14. The composition according to claim 13 wherein said antistatic agent is an ester or salt thereof selected from:

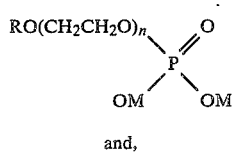

and,

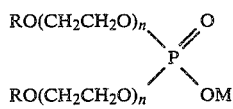

wherein
R is an alkyl or alkylaryl radical,
n is 1–20 inclusive, and
M is hydrogen, ammonia, ammonium, or metal.

15. The composition according to claim 14 wherein R is an alkyl radical of 20 carbons or less.

16. The composition according to claim 13 wherein said co-curing agent is a monomer possessing at least two sites of unsaturation available for participation in curing the composition.

17. The composition according to claim 13 wherein said co-curing agent is a polyfunctional methacrylate monomer.

* * * * *